United States Patent
Carlsson et al.

(10) Patent No.: US 8,722,827 B2
(45) Date of Patent: May 13, 2014

(54) CROSS-LINKABLE POLYOLEFIN COMPOSITION COMPRISING TWO TYPES OF SILANE GROUPS

(75) Inventors: Roger Carlsson, Save (SE); Kristian Dahlen, Stora Hoga (SE)

(73) Assignee: Borealis AG (AT)

( * ) Notice: Subject to any disclaimer, the term of this patent is extended or adjusted under 35 U.S.C. 154(b) by 218 days.

(21) Appl. No.: 13/318,114

(22) PCT Filed: May 14, 2010

(86) PCT No.: PCT/EP2010/002971
§ 371 (c)(1),
(2), (4) Date: Dec. 5, 2011

(87) PCT Pub. No.: WO2010/130457
PCT Pub. Date: Nov. 18, 2010

(65) Prior Publication Data
US 2012/0065349 A1   Mar. 15, 2012

(30) Foreign Application Priority Data

May 14, 2009  (EP) ..................................... 09006546
Mar. 3, 2010  (EP) ..................................... 10002178

(51) Int. Cl.
*C08F 230/08*   (2006.01)
(52) U.S. Cl.
USPC ........................................................ 526/279
(58) Field of Classification Search
USPC ........................................................ 526/279
See application file for complete search history.

(56) References Cited

U.S. PATENT DOCUMENTS

| 4,689,369 A | 8/1987 | Ishino et al. |
| 2008/0176981 A1 | 7/2008 | Biscoglio et al. |

FOREIGN PATENT DOCUMENTS

| EP | 1 849 816 A1 * | 10/2007 | ................. C08J 3/22 |
| EP | 1849816 A | 10/2007 | |
| EP | 1862492 A | 12/2007 | |
| EP | 1862500 A | 12/2007 | |
| EP | 1862501 A | 12/2007 | |
| JP | 54076647 A | 6/1979 | |
| JP | 60139713 A | 7/1985 | |
| WO | 9517463 A | 6/1995 | |

OTHER PUBLICATIONS

International Search Report and Written Opinion for PCT/EP2001/002971, dated Aug. 20, 2010.
Notification and Transmittal of International Preliminary Report on Patentability for International Application No. PCT/EP2010/002971, mailed Jan. 16, 2012.

* cited by examiner

*Primary Examiner* — Robert D. Harlan
(74) *Attorney, Agent, or Firm* — Milbank, Tweed, Hadley & McCloy LLP

(57) ABSTRACT

The present invention relates to a polyolefin composition comprising a cross-linkable polyolefin with
(A) hydrolysable silane groups which upon hydrolysation form an acid or a base,
(B) hydrolysable silane groups different from silane groups (A).

13 Claims, No Drawings

CROSS-LINKABLE POLYOLEFIN COMPOSITION COMPRISING TWO TYPES OF SILANE GROUPS

This application, filed under 35 U.S.C. §371, is based on International Application PCT/EP2010/002971 filed May 14, 2010, which claims priority to European Patent Application No. 09006546.7, filed on May 14, 2009 and European Patent Application No. 10002178.1, filed on Mar. 3, 2010, the disclosures of which are herein incorporated by reference in their entireties.

The present invention relates to polyolefin compositions comprising a cross-linkable polyolefin with hydrolysable silane groups, to a wire or cable comprising such compositions, to the use of such compositions for the production of a wire or cable, to the use of a hydrolysed silane group containing polyolefin or non-polymeric compound as silanol condensation catalyst, and to the use of a non-polymeric silane group containing compound as a scorch retarding agent.

It is known to cross-link polyolefins by means of additives as this improves several of the properties of the polyolefin, such as mechanical strength and chemical heat resistance. Cross-linking may be performed by condensation of silanol groups contained in the polyolefin which can be obtained by hydrolysation of silane groups. A silane compound may be introduced as a cross-linkable group into a polyolefin e.g. by grafting the silane compound onto the polyolefin, or by copolymerisation of olefin monomers and silane group containing monomers. Such techniques are known e.g. from U.S. Pat. Nos. 4,413,066, 4,297,310, 4,351,876, 4,397,981, 4,446,283 and 4,456,704.

In the present invention, the polyolefin composition is particularly used for the production of a wire or cable, in particular a low, medium or high voltage cable. Electric power cables for low voltages, i.e. voltages of below 3 kV, usually comprise an electric conductor which is coated with an insulation layer. Such low voltage cables are also denoted as single wire cables. Optionally, two or more of such single wire cables are surrounded by a common outermost sheath layer, the jacket.

A typical medium voltage power cable, usually used for voltages from 3 to 36 kV, and a typical high voltage cable used for voltages higher than 36 kV, comprises one or more conductors in a cable core that is surrounded by several layers of polymeric materials, including an inner semiconducting layer, followed by an insulating layer, and then an outer semiconducting layer. These layers are normally crosslinked. To these layers, further layers may be added, such as a metallic tape or wire shield, and, finally, an outermost jacketing layer. The layers of the cable are based on different types of polymer compositions. As insulating materials, mainly cross-linked polyolefins such as crosslinked low density polyethylene are used.

As hydrolysable silane groups in cross-linkable polyolefins today predominantly alkoxy groups are used. For cross-linking of polyolefins containing such hydrolysable silane groups, a silanol condensation catalyst must be used. Conventional catalysts are, for example, tin-, zinc-, iron-, lead- or cobalt-organic compounds such as dibutyl tin dilaurate (DBTDL). The cross-linking process may advantageously be carried out in the presence of Brönsted acid silanol condensation catalysts. In contrast to the conventional metal-organic catalysts these catalysts allow cross-linking to quickly take place already at room temperature. Such acidic silanol condensation catalysts are disclosed for example in WO 95/17463.

However, it is known that these Brönsted acids are comparatively strong acids, which gives rise to problems with corrosion and interaction with colour masterbatches and other additives.

Furthermore, it is a known that in order to obtain a homogeneous end-product a good mixing of the components of the polyolefin composition must be achieved, which is usually done by compounding the polyolefin composition in an extruder. However, due to the presence of cross-linkable silane groups in the composition and the elevated temperature and pressure in the extruder undesired cross-linking of the composition already in the extruder may take place, which is known as "scorch".

It is hence an object of the present invention to provide a polyolefin composition comprising a crosslinkable polyolefin with hydrolysable silane groups which can be cross-linked using milder conditions, for example by avoiding the addition of strong acids to the composition, but still allowing for quick cross-linking desirably at room temperature, and for a high cross-linking degree.

It is a further object of the invention to provide a compound for a polyolefin composition comprising a cross-linkable polyolefin with hydrolysable silane groups which reduces undesired cross-linking, i.e. scorch, during extrusion of the composition.

It has now surprisingly been found that the above objects can be achieved by the use of a polyolefin composition in which a component is present containing hydrolysable silane groups which upon hydrolysation form an acid or a base and, simultaneously, hydrolysable silane groups which do not form an acid or a base upon hydrolysation.

The present invention therefore provides a polyolefin composition comprising a cross-linkable polyolefin with (A) hydrolysable silane groups which upon hydrolysation form an acid or a base,
(B) hydrolysable silane groups different from silane groups (A).

In a preferred embodiment, the composition of the invention after cross-linking in a water bath at 90° C. for 40 h shows a cross-linking degree of at least 40%, more preferably at least 50%, and most preferably at least 60%.

Of course, the cross-linking test of the polymer composition in a water bath at 90° C. for 40 h has to be made after the composition has been freshly prepared.

The silane groups which form an acid or a base upon hydrolysation undergo hydrolysis faster than the commonly used alkoxy silane groups. Thus, a faster and easier cross-linking is obtained which allows for milder conditions during the cross-linking step, e.g. by use of a weaker acid or a base as a silanol condensation catalyst.

Furthermore, the acid or base formed upon hydrolysis in the compositions of both embodiments may itself serve as a silanol condensation catalyst, so that the addition of a separately added silanol condensation catalytic agent can be minimised or even dispensed with. Due to the fact that the catalyst is only "released" upon hydrolysis, a premature, unwanted cross-linking can be avoided or reduced.

In the following, further preferred embodiments of the composition of the invention are described.

Preferably, the acid or the base formed in the composition upon hydrolysation of the silane groups (A) is a Brönsted acid or base.

If an acid is formed in the composition upon hydrolysation of the silane group containing compound this acid preferably has a $pK_a$ value of 6 or less, more preferably has a $pK_a$ value of 5.5 or less, still more preferably has a $pK_a$ value of 5 or less, still more preferably has a p$K_a$ value of 4.5 or less, still more preferably has a p$K_a$ value of 4 or less, and most preferably has a p$K_a$ value of 3 or less.

If a base is formed in the composition upon hydrolysation of the silane group containing compound this base preferably has a p$K_b$ value of 10 or less, more preferably has a p$K_b$ value of 5 or less preferably has a p$K_b$ value of 4 or less.

The acid or base formed upon hydrolysation preferably is selected from the group of carboxylic acids, sulphonic acids, phosphorous acids, halogen acids, oxoacids, oximes, imines and amines, and more preferably upon hydrolysation a carboxylic acid is formed.

The cross-linkable polyolefin of the compositions of the invention preferably comprises, still more preferably consists of, a polyethylene containing hydrolysable silane groups.

The hydrolysable silane groups may be introduced into the cross-linkable polyolefin of the composition of the invention polyolefin by copolymerisation of e.g. ethylene monomers with slime group containing comonomers or by grafting, i.e. by chemical modification of the polymer by addition of silane groups mostly in a radical reaction. Both techniques are well known in the art.

Preferably, the silane group containing polyolefin has been obtained by copolymerisation.

Preferably, an unsaturated silane compound is used for the preparation of the cross-linkable polyolefin with hydrolysable silane groups which upon hydrolysation form an acid or a base, which is represented by the formula

wherein
$R^1$ is a non-hydrolysable hydrocarbyl group which comprises 2 to 30 carbon atoms, which further comprises at least one unsaturated group, and which may contain heteroatoms so that functional groups such as ester, amide, imide, ether, thioether or amine may be present in $R^1$,
$R^2$, $R^3$ and $R^4$ are organic residues which may be the same or different from each other with the proviso that at least one thereof will generate an acid or a base upon hydrolysation.

In the preferred embodiment where the acid or base formed upon hydrolysation is a carboxylic acid, at least one of $R^2$, $R^3$ and $R^4$ is an acyloxy group. More preferably one or two of $R^2$, $R^3$ and $R^4$ are acyloxy groups, and the remainder of $R^2$, $R^3$ and $R^4$ are other groups.

The acyloxy group(s) are preferably selected from the group consisting of C1-50 alkanoyloxy, C2-50 alkenoyloxy, C3-50 alkynoyloxy and C7-60 arenoyloxy groups, more preferably from the group consisting of C1-30 alkanoyloxy, C3-30 alkenoyloxy, C3-30 alkynoyloxy and C7-40 arenoyloxy groups.

Still more preferably, the acyloxy group(s) are selected from the group consisting of C10-26 alkanoyloxy or alkenoyloxy groups, more preferably C10-26 alkanoyloxy groups.

An example for the unsaturated silane compounds for the preparation of the crosslinkable polyolefin with hydrolysable silane groups which upon hydrolysation forms a carboxylic acid is vinyl triacetoxy silane.

In the embodiment where the acid or base formed upon hydrolysation is a base, preferably at least one of $R^2$, $R^3$ and $R^4$ is an amino group, so that an amine is formed. More preferably one or two of $R^2$, $R^3$ and $R^4$ are amino groups, and the remainder of $R^2$, $R^3$ and $R^4$ are other groups.

The substituents at the N atom of the amino groups preferably are selected from the group consisting of C1-C12 alkyl, C2-C12 alkenyl, C2-C12 alkynyl and C7 to C18 arenyl groups, more preferably from the group consisting of C1-C6 alkyl, C2-C6 alkenyl, C2-C6 alkynyl and C7 to C12 arenyl groups.

Preferred examples for the unsaturated silane compounds for the preparation of the crosslinkable polyolefin with hydrolysable silane groups which upon hydrolysation forms an amine are allyl dimethyl (diisopropyl amino) silane and bis(dimethyl amino) vinyl methyl silane.

In the cross-linkable polyolefin hydrolysable silane groups (B) are present, which are different from hydrolysable silane groups (B), i.e. which upon hydrolysation do not form an acid or a base.

It is preferred that hydrolysable silane groups (B) are represented by the formula

wherein A is a hydrocarbyl group having 1-8 carbon atoms, preferably 1-4 carbon atoms.

The most preferred compounds are vinyl trimethoxy silane, vinyl bismethoxyethoxy silane, vinyl triethoxy silane, gamma-(meth)acryl-oxypropyl trimethoxy silane, and gamma(meth)acryloxypropyl triethoxy silane, or combinations of two or more thereof.

The cross-linkable polyolefin with hydrolysable silane groups (A) and (B) may be prepared by grafting or copolymerisation, preferably by copolymerisation. In this copolymerisation the at least three types of monomers are copolymerised to form the cross-linkable polyolefin, preferably polyethylene.

The copolymerisation of the olefin, e.g. ethylene, and the unsaturated silane compounds may be carried out under any suitable conditions resulting in the copolymerisation of the monomers.

It is preferred that copolymerisation of the olefin, e.g. ethylene, and the unsaturated silane compounds is carried out as a high pressure polymerisation process in the absence of a polymerisation catalyst.

Preferably, in the polyolefin composition of the invention the molar ratio between silane groups (A) and silane groups (B) is from 50:50 to 0.001:99.999, more preferably is from 20:80 to 0.01:99.99, still more preferably is from 5:95 to 0.05:99.95, still more preferably is from 1:99 to 0.1:99.9, and most preferably is from 0.7:99.3 to 0.3:99.7.

The cross-linkable polyolefin with hydrolysable silane groups (A) and (B) preferably contains a total of 0.001 to 15 wt. % of silane group containing monomers, more preferably 0.01 to 5 wt. %, and still more preferably 0.3 to 3 wt %, and most preferably 0.1 to 2 wt. %.

The total amount of crosslinkable polyolefin with hydrolysable silane groups (A) and (B) which upon hydrolysation form an acid or a base in the composition is at least 25 wt. %, more preferably at least 50 wt. %, and still more preferably is at least 75 wt. %.

The polyolefin compositions of the invention may further comprise a polyolefin with polar groups.

Preferably, the polar groups are selected from siloxane, amide, anhydride, carboxylic, carbonyl, hydroxyl, ester and epoxy groups.

The polar groups may for example be introduced into the polymer by grafting of an ethylene polymer with a polar-group containing compound, i.e. by chemical modification of the polyolefin by addition of a polar group containing compound mostly in a radical reaction. Grafting is e.g. described in U.S. Pat. Nos. 3,646,155 and 4,117,195.

It is, however, preferred that said polar groups are introduced into the polymer by copolymerisation of olefinic, including ethylene, monomers with comonomers bearing polar groups.

As examples of comonomers having polar groups may be mentioned the following: (a) vinyl carboxylate esters, such as vinyl acetate and vinyl pivalate, (b) (meth)acrylates, such as methyl(meth)acrylate, ethyl(meth)-acrylate, butyl(meth)acrylate and hydroxyethyl(meth)acrylate, (c) olefinically unsaturated carboxylic acids, such as (meth)acrylic acid, maleic acid and fumaric acid, (d) (meth)acrylic acid derivatives, such as (meth)acrylonitrile and (meth)acrylic amide, and (e) vinyl ethers, such as vinyl methyl ether and vinyl phenyl ether.

Amongst these comonomers, vinyl esters of monocarboxylic acids having 1 to 4 carbon atoms, such as vinyl acetate, and (meth)acrylates of alcohols having 1 to 4 carbon atoms, such as methyl (meth)acrylate, are preferred. Especially preferred comonomers are butyl acrylate, ethyl acrylate and methyl acrylate. Two or more such olefinically unsaturated compounds may be used in combination. The term "(meth)acrylic acid" is intended to embrace both acrylic acid and methacrylic acid.

Preferably, the polar group containing monomer units are selected from the group of acrylates.

The amount of polar group containing monomer units in the polyolefin preferably is 40 wt. % or less, more preferably 35 wt. % or less, and still more preferably is between 1 and 20 wt. %.

Furthermore, preferably the polar group containing monomer units are present in the polyolefin in an amount of from 1 to 15 mol %, more preferably 3 to 10 mol %, and most preferably 3.5 to 6 mol %.

In a particularly preferred embodiment, the crosslinkable polyolefin with hydrolysable silane groups in the compositions of the invention at the same time also contains the polar groups in any of the embodiments as described hereinbefore, i.e. the polyolefin is a terpolymer containing both the silane groups and the polar groups.

Furthermore, also the preferred amounts for the silane group and the polar group containing monomers as described above apply for the terpolymer.

Such terpolymers may be produced by grafting, or, preferably, by copolymerisation of olefin monomers and unsaturated monomers containing silane groups and polar groups.

If such a terpolymer containing both the silane groups and the polar groups is used in the composition of the invention, it is preferred that it makes up at least 80 wt. % of the total composition, more preferably at least 85 wt. %, and most preferably at least 90 wt. %.

In the polyolefin composition according to the invention preferably no separately added silanol condensation catalyst different from the acid or base formed upon hydrolysation of the hydrolysable silane groups is present.

However, in general, such a separately added silanol condensation catalyst different from the acid or base formed upon hydrolysation of the hydrolysable silane groups may be present.

If this is the case, it is preferred that separately added silanol condensation catalyst present in an amount of 0.0001 to 6 wt. %, more preferably of 0.001 to 2 wt. %, and most preferably 0.02 to 0.5 wt. %.

Conventional silanol condensation catalysts are for example tin-organic compounds such as dibutyl tin dilaurate (DBTDL).

Preferably, an acidic silanol condensation catalyst is used. Such acidic silanol condensation catalysts are disclosed for example in WO 95/17463.

The silanol condensation catalysts of the polyolefin composition preferably is a Brönsted acid, i.e. is a substance which acts as a proton donor.

The Brönsted acids may comprise inorganic acids such as sulphuric acid and hydrochloric acid, and organic acids such as citric acid, stearic acid, acetic acid, sulphonic acid and alkanoic acids as dodecanoic acid, or a precursor of any of the compounds mentioned.

Preferably, the Brönsted acid is a sulphonic acid, more preferably an organic sulphonic acid.

Still more preferably, the Brönsted acid is an organic sulphonic acid comprising 10 C-atoms or more, more preferably 12 C-atoms or more, and most preferably 14 C-atoms or more, the sulphonic acid further comprising at least one aromatic group which may e.g. be a benzene, naphthalene, phenantrene or anthracene group. In the organic sulphonic acid, one, two or more sulphonic acid groups may be present, and the sulphonic acid group(s) may either be attached to a non-aromatic, or preferably to an aromatic group, of the organic sulphonic acid.

Further preferred, the aromatic organic sulphonic acid comprises the structural element:

$$Ar(SO_3H)_x \qquad (IV)$$

with Ar being an aryl group which may be substituted or non-substituted, and x being at least 1.

The organic aromatic sulphonic acid silanol condensation catalyst may comprise the structural unit according to formula (IV) one or several times, e.g. two or three times. For example, two structural units according to formula (IV) may be linked to each other via a bridging group such as an alkylene group.

Preferably, Ar is a aryl group which is substituted with at least one C4- to C30-hydrocarbyl group, more preferably C4- to C30-alkyl group.

Aryl group Ar preferably is a phenyl group, a naphthalene group or an aromatic group comprising three fused rings such as phenantrene and anthracene.

Preferably, in formula (IV) x is 1, 2 or 3, and more preferably x is 1 or 2.

Furthermore, preferably the compound used as organic aromatic sulphonic acid silanol condensation catalyst has from 10 to 200 C-atoms, more preferably from 14 to 100 C-atoms.

In one preferred embodiment, Ar is a hydrocarbyl substituted aryl group and the total compound containing 14 to 28 carbon atoms, and still further preferred, the Ar group is a hydrocarbyl substituted benzene or naphthalene ring, the hydrocarbyl radical or radicals containing 8 to 20 carbon atoms in the benzene case and 4 to 18 atoms in the naphthalene case.

It is further preferred that the hydrocarbyl radical is an alkyl substituent having 10 to 18 carbon atoms and still more preferred that the alkyl substituent contains 12 carbon atoms and is selected from dodecyl and tetrapropyl. Due to commercial availability it is most preferred that the aryl group is a benzene substituted group with an alkyl substituent containing 12 carbon atoms.

The currently most preferred compounds are dodecyl benzene sulphonic acid and tetrapropyl benzene sulphonic acid.

The silanol condensation catalyst may also be precursor of the sulphonic acid compound, including all its preferred embodiments mentioned, i.e. a compound that is converted by hydrolysis to such a compound. Such a precursor is for example the acid anhydride of a sulphonic acid compound, or a sulphonic acid that has been provided with a hydrolysable protective group, as e.g. an acetyl group, which can be removed by hydrolysis.

In a second preferred embodiment, the sulphonic acid catalyst is selected from those as described in EP 1 309 631 and EP 1 309 632, namely a) a compound selected from the group of
(i) an alkylated naphthalene monosulfonic acid substituted with 1 to 4 alkyl groups wherein each alkyl group is a linear or branched alkyl with 5 to 40 carbons with each alkyl group being the same or different and wherein the total number of carbons in the alkyl groups is in the range of 20 to 80 carbons;
(ii) an arylalkyl sulfonic acid wherein the aryl is phenyl or naphthyl and is substituted with 1 to 4 alkyl groups wherein each alkyl group is a linear or branched alkyl with 5 to 40 carbons with each alkyl group being the same or different and wherein the total number of carbons in the alkyl groups is in the range of 12 to 80;
(iii) a derivative of (i) or (ii) selected from the group consisting of an anhydride, an ester, an acetylate, an epoxy blocked ester and an amine salt thereof which is hydrolysable to the corresponding alkyl naphthalene monosulfonic acid or the arylalkyl sulfonic acid;
(iv) a metal salt of (i) or (ii) wherein the metal ion is selected from the group consisting of copper, aluminium, tin and zinc; and b) a compound selected from the group of
(i) an alkylated aryl disulfonic acid selected from the group consisting of the structure (V):

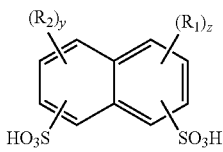

and the structure (VI):

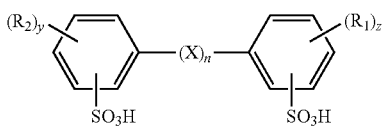

wherein each of $R_1$ and $R_2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of —C($R_3$)($R_4$)—, wherein each of $R_3$ and $R_4$ is H or independently a linear or branched alkyl group of 1 to 4 carbons and n is 1; —C(=O)—, wherein n is 1; —S—, wherein n is 1 to 3 and —S(O)2-, wherein n is 1; and
(ii) a derivative of (i) selected from the group consisting of the anhydrides, esters, epoxy blocked sulfonic acid esters, acetylates, and amine salts thereof which is a hydrolysable to the alkylated aryl disulfonic acid,
together with all preferred embodiments of those sulphonic acids as described in the mentioned European Patents.

The polyolefin compositions according to the invention may further contain various additives, such as miscible thermoplastics, antioxidants, further stabilizers e.g. water tree retardants, scorch retardants, lubricants, fillers, colouring agents and foaming agents.

The total amount of additives is generally 0.3 to 10 wt. %, preferably 1 to 7 wt. %, more preferably 1 to 5 wt. %.

As antioxidant, preferably a compound, or a mixture of such compounds, is used which is neutral or acidic, must comprise a sterically hindered phenol group or aliphatic sulphur groups. Such compounds are disclosed in EP 1 254 923 to be particularly suitable antioxidants for stabilisation of polyolefins containing hydrolysable silane groups which are crosslinked with a silanol condensation catalyst, in particular an acidic silanol condensation catalyst. Other preferred antioxidants are disclosed in WO2005003199A1.

Preferably, the antioxidant is present in the composition in an amount of from 0.01 to 3 wt. %, more preferably 0.05 to 2 wt %, and most preferably 0.08 to 1.5 wt. %.

Compounding may be performed by any known compounding process, including extruding the final product with a screw extruder or a kneader.

The present invention furthermore relates to an article, such as a wire or cable, a film, or a pipe comprising the polyolefin composition in any of the above described embodiments.

In particular, the present invention furthermore relates to a wire or cable, in particular a low, medium or high voltage cable.

A medium or high voltage cable usually comprises one or more conductors in a cable core, an inner semiconducting layer, followed by an insulating layer, and then an outer semiconducting layer, wherein at least one of these layers, preferably the insulating layer, comprises the polyolefin composition as described above.

Insulating layers for medium or high voltage power cables generally have a thickness of at least 2 mm, typically at least 2.3 mm, and the thickness increases with increasing voltage the cable is designed for.

In addition to the semiconductive and insulating layers, further layers may be present in medium or high voltage cables, such as a metallic tape or wire shield, and, finally, an outermost jacketing layer.

Usually, the cable is produced by co-extrusion of the different layers onto the conducting core. Then, crosslinking is performed by moisture curing, wherein the silane groups are hydrolysed under the influence of water or steam, resulting in the splitting off of alcohol and the formation of silanol groups, which are then cross-linked in a condensation reaction wherein water is split off.

Usually, moisture curing is performed in a sauna or water bath at temperatures of 70 to 100° C.

The invention relates furthermore to the use of a polyolefin composition in any of the above described embodiments for the production of a layer of a cable.

The present invention is further illustrated by means of the following examples.

EXAMPLES

1. Measurement Methods a) Cross-Linking Test at 90° C. in Waterbath

A tape with 1.7 mm in thickness is extruded from the composition to be tested and is then cross-linked for a specific amount of time at a temperature of 90° C. in a waterbath.

b) Cross-Linking Degree

The cross-linking degree of the composition is measured by decalin extraction according to ASTM D 2765-1, with the exception that after the extraction with decalin for 6 hours, the extraction was continued another 1 hour in pure, boiling decalin.

c) Melt Flow Rate

The melt flow rate (MFR) is determined according to ISO 1133 and is indicated in g/10 min. The MFR for ethylene polymers is determined at 190° C. and may be determined at different loadings such as 2.16 kg (MFR$_2$) or 21.6 kg (MFR$_{21}$).

2. Example a) Polymerization

An ethylene terpolymer resin containing vinyl triacethoxy silane groups and vinyl trimethoxy silane groups was produced in an autoclave reactor with an ethylene flow of roughly 8 kg/h and the output of 1 kg/day. The pressure during polymerization was 1900 bar and the temperature was 230° C.

The initiator cocktail used is shown in Table 1.

TABLE 1

| Initiator cocktail composition (mol-%) | |
|---|---|
| Luperox 11M75 | 15 |
| Luperox 7M50 | 29 |
| Luperox 26 | 56 |

As Chain Transfer Agent (CTA) propionic aldehyde was used. CTA, comonomers (vinyl trimethoxy slime and vinyl triacethoxy silane) and initiator cocktail was dissolved in heptane. The composition of the comonomers is shown in Table 2.

TABLE 2

| Comonomer and CTA cocktail composition (weight-%) | |
|---|---|
| Propionic aldehyde | 4 |
| Vinyl trimethoxy silane | 17 |
| Vinyl triacethoxy silane | 40 |
| Heptane | 39 |

After polymerisation an ethylene terpolymer was obtained in which vinyl trimethoxy silane units were present in an amount of 0.56 weight % and vinyl triacethoxy silane units in an amount of 0.13 weight %.

b) Properties of Terpolymer

To polymer powder directly withdrawn from the reactor was added HDTMS (hexadecyl trimethoxysilane) in an amount of 1.5 wt. % and the resulting powder containing the HDTMS was put into an alumina bag and sealed. This bag was stored at ambient temperature for 10 days.

Then, the cross-linking degree of the so-treated terpolymer was determined according to above method b) and a value of 85.4% for the cross-linking degree was obtained.

This result shows that olefin polymers containing both silane groups which upon hydrolysation form an acid or a base and silane groups different from the first type of silane groups show ready cross-linking even under mild conditions and even without that a (silanol condensation catalyst is added to the composition. This shows that the acid or base formed upon hydrolysation of the first type of silane groups act effectively as "internal" silanol condensation catalyst.

The invention claimed is:

1. A polyolefin composition comprising a cross-linkable polyolefin with:
   (A) hydrolysable silane groups which upon hydrolysation form an acid or a base, satisfying formula (I) as follows:

wherein $R^1$ is a non-hydrolysable hydrocarbyl group, which comprises 2 to 30 carbon atoms, and which further comprises at least one unsaturated group; and $R^2$, $R^3$ and $R^4$ are organic residues;
   wherein at least one of $R^2$, $R^3$ and $R^4$ generates an acid or a base upon hydrolysation; and
   (B) hydrolysable silane groups different from silane groups (A), satisfying formula (II) as follows:

wherein A is a hydrocarbyl group having 1-8 carbon atoms.

2. The polyolefin composition according to claim 1, wherein the composition after cross-linking in a water bath at 90° C. for 40 h shows a cross-linking degree of at least 40%.

3. The polyolefin composition according to claim 1, wherein the molar ratio between hydrolysable silane groups (A) and hydrolysable silane groups (B) is from 50:50 to 0.001:99.999.

4. The polyolefin composition according to claim 3, wherein the molar ratio between hydrolysable silane groups (A) and hydrolysable silane groups (B) is from 20:80 to 0.01:99.99.

5. The polyolefin composition according to claim 1, wherein in the cross-linkable polyolefin with hydrolysable silane groups (A) and (B) silane groups are present in a total amount of 0.001 to 15 wt. %.

6. The polyolefin composition according to claim 1, wherein in the cross-linkable polyolefin with hydrolysable silane groups (A) and (B) silane groups are present in a total amount of 0.01 to 5 wt. %.

7. The polyolefin composition according to claim 1, wherein in the cross-linkable polyolefin with hydrolysable silane groups (A) and (B) silane groups are present in a total amount of 0.1 to 2 wt. %.

8. The polyolefin composition according to claim 1, wherein the acid or base formed upon hydrolysation of silane groups (A) is selected from the group of carboxylic acids, sulphonic acids, phosphorous acids, halogen acids, oxoacids, oximes, imines and amines.

9. The polyolefin composition according to claim 8, wherein the acid or base formed upon hydrolysation is a carboxylic acid.

10. The polyolefin composition according to claim 1, wherein the crosslinkable polyolefin with hydrolysable silane groups (A) and (B) is a polyethylene with hydrolysable silane groups.

11. An article comprising the composition of claim 1.

12. The article according to claim 11, which is a wire or cable.

13. The polyolefin composition according to claim 1, wherein $R^1$ comprises heteroatoms so that functional groups such as ester, amide, imide, ether, thioether or amine may be present in $R^1$.

* * * * *